(12) United States Patent
Zhou

(10) Patent No.: US 8,717,186 B2
(45) Date of Patent: May 6, 2014

(54) DETECTION OF SWELLING IN BATTERIES

(76) Inventor: Xunwei Zhou, Milpitas, CA (US)

( * ) Notice: Subject to any disclaimer, the term of this patent is extended or adjusted under 35 U.S.C. 154(b) by 85 days.

(21) Appl. No.: 13/535,378

(22) Filed: Jun. 28, 2012

(65) Prior Publication Data

US 2014/0002269 A1  Jan. 2, 2014

(51) Int. Cl.
*G08B 21/00* (2006.01)
(52) U.S. Cl.
USPC ............ 340/636.11; 340/693.2; 340/644
(58) Field of Classification Search
USPC ............... 340/636.11, 636.1, 635, 340/636.12–636.13, 636.19, 644, 683, 340/691.6, 692, 693.2
See application file for complete search history.

(56) References Cited

U.S. PATENT DOCUMENTS

| | | | | |
|---|---|---|---|---|
| 5,886,638 A * | 3/1999 | Tanguay | | 340/632 |
| 7,511,456 B2 | 3/2009 | Lee et al. | | |
| 7,545,119 B1 * | 6/2009 | Egan et al. | | 320/136 |
| 7,710,732 B2 * | 5/2010 | Droz | | 361/728 |
| 7,826,189 B1 | 11/2010 | Edwards | | |
| 7,830,125 B2 | 11/2010 | Ibrahim | | |
| 8,035,346 B2 * | 10/2011 | Tsai | | 320/136 |
| 2010/0068607 A1 * | 3/2010 | Spare et al. | | 429/90 |
| 2013/0002017 A1 * | 1/2013 | Yano et al. | | 307/10.7 |

* cited by examiner

*Primary Examiner* — Daniel Previl

(57) ABSTRACT

For detecting swelling in batteries supplying power to electrical equipment, at least one contact sensor such as quantum tunneling composite ("QTC") based pressure-capacitive sensor coated on one surface with a layer of conductive material such as indium tin oxide ("ITO") or a capacitive sensor coated with the same conductive material is used for attachment to each battery. A capacitance measuring module including a microcontroller is connected to the contact sensor and measures the capacitance of the ITO—coated conductor. If the capacitance under measurement represents an increase in capacitance exceeding a predetermined threshold, indicative of battery swelling, a call for battery replacement and interruption of battery power to the electrical equipment are initiated.

17 Claims, 4 Drawing Sheets

DETECTION OF SWELLING IN BATTERIES

FIELD

The subject matter disclosed herein relates to safety of batteries powering an electrical equipment and more particularly relates to detection of swelling in batteries prior to their failure, thereby preventing potential hazards.

BACKGROUND

Description of the Related Art

After a long use, batteries supplying power to an electrical equipment are subject to swelling. Undetected swelling may lead to impending battery failure and possible safety hazards.

BRIEF SUMMARY

The apparatus to detect swelling in batteries for an electrical equipment is provided with a logic unit containing a plurality of modules configured to functionally execute the necessary steps of such detection. These modules in the disclosed embodiments include at least one contact sensor and a capacitance measuring module. The contact sensor includes a structure of at least one layer of electrically insulating material, which is configured to have a first face in contact with a battery and a second face opposite to the first face. The second face is coated with a layer of electrically conductive material. The capacitance measuring module that can be connected to said at least one contact sensor measures the capacitance on the coated face. If an increase in capacitance under measurement exceeds a predetermined threshold, the capacitance measuring module outputs a warning signal.

In another aspect of the present invention, a system is presented to detect swelling in batteries. In particular, the system, in the disclosed embodiments, includes an electrical equipment, at least one battery in a battery pack having a positive and negative output terminals coupled to the electrical equipment, a relay in series with a coupling path to each said output terminal from the battery pack, a central battery controller interfacing with each said battery configured to turn said relays on/off and provide communication, at least one contact sensor, and a capacitance measuring module. Said at least one contact sensor includes a structure of at least one layer of electrically insulating material, which is configured to have a first face in contact with a battery and a second face opposite to the first face. The second face is coated with a layer of electrically conductive material. The capacitance measuring module that can be connected to said at least one contact sensor measures the capacitance on the coated face. If an increase in capacitance under measurement exceeds a predetermined threshold, the capacitance measuring module outputs a warning signal.

A method of the present invention is also presented for detecting swelling in batteries. The method in the disclosed embodiments substantially includes the steps necessary to carry out the functions presented above with respect to the operation of the described apparatus and system. The method includes providing at least one contact sensor including a structure of one or more layers of electrically insulating material, which has a first face attachable to a battery and a second face opposite to the first face, the second face being coated with a layer of electrically conductive material, attaching the first face to the battery, powering the electrical equipment for operation, measuring capacitance of the coated conductive material, outputting a warning signal in response to detecting that the increase in capacitance under measurement exceeds a predetermined threshold, and calling for a replacement of the swelling battery and interrupting battery power to the electrical equipment.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
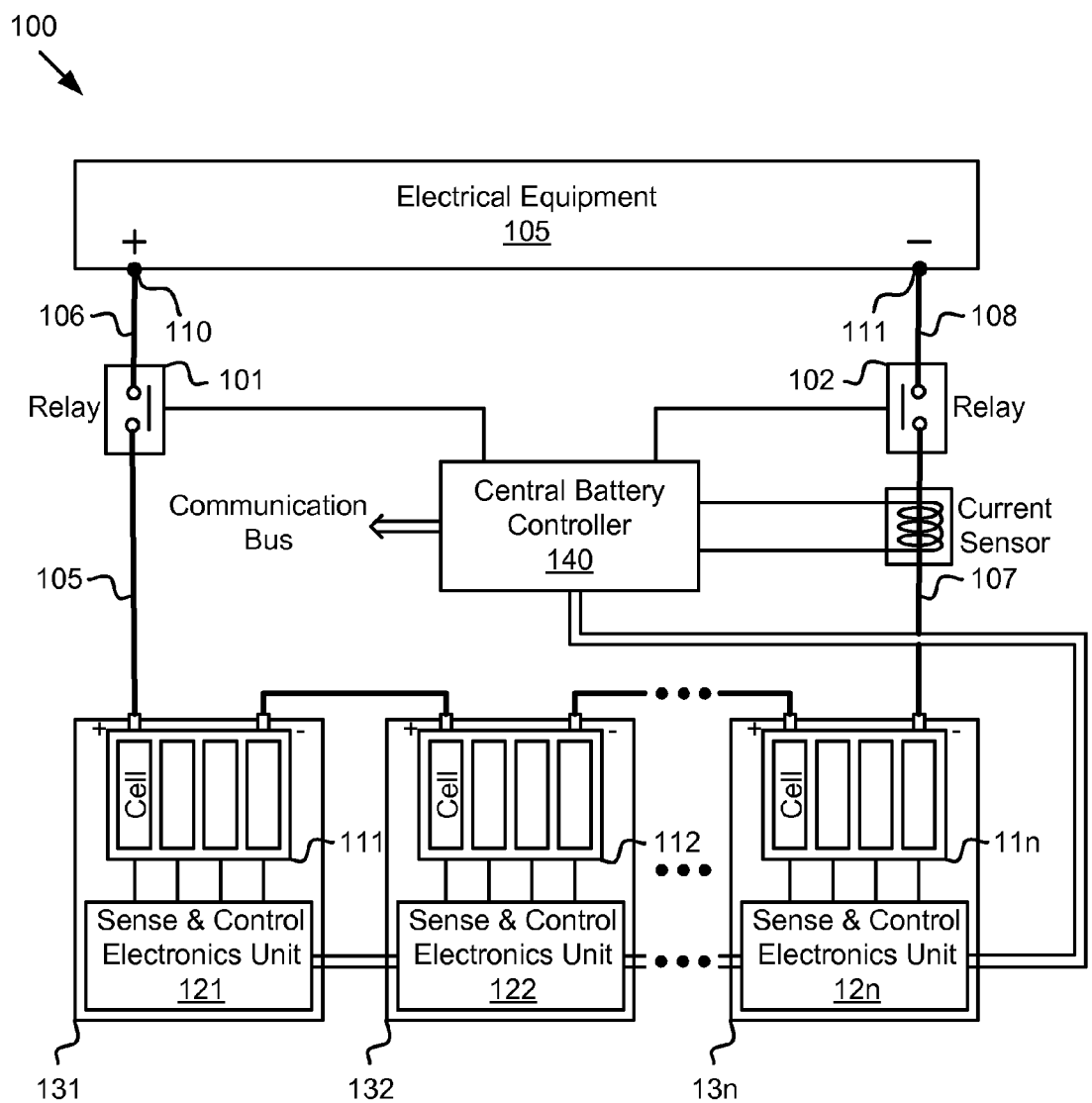
FIG. 1 is a schematic block diagram illustrating one embodiment of a system for supplying battery power to electrical equipment in accordance with the present invention.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

The term "circuit" means at least either a single component or a multiplicity of components, either active and/or passive, that are coupled together to provide a desired function or functions. The term "signal" means at least one current, voltage, charge, temperature, data, or other signal. A signal may be used to communicate using active high, active low, time multiplexed, synchronous, asynchronous, differential, single-ended, or any other digital or analog signaling or modulation techniques. References in the singular are made merely for clarity of reading and include plural references unless plural references are specifically excluded.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, microcontroller, or other programmable data processing apparatus to produce a machine, such that the instructions, which execute via the processor of the computer or other programmable data processing apparatus, create means for implementing the functions/acts specified in the schematic flowchart diagrams and/or schematic block diagram block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagram block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures (also referred to as FIGs) illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic drawing illustrating one embodiment of a system 100 for supplying battery power to electrical equipment 105 in accordance with the present invention. Typically, the electrical equipment 105 is powered by a battery pack that includes a number of series-connected battery modules, and the battery power may be turned on or turned off as required to operate the electrical equipment 105 or stop the operation of the electrical equipment 105. The system 100 includes electrical equipment 105, batteries 131-13n, central battery controller 140, relays 101-102, and a current sensor. In certain embodiments, there may be cooling means (not shown) used to keep batteries 131-13n operating within specified temperature limits. The electrical equipment 105 may be of various sizes, ranging from portable electronic device to medium- to large-sized power tool and to supersized hybrid electric vehicle ("HEV") and electric vehicle ("EV"). As such, the battery count may range from one to many.

Each battery 131-13n generally includes a stack of cells 111-11n and a sense & control electronics unit 121-12n and is often also referred to as battery module. Nowadays Lithium Ion ("Li-Ion") batteries or another lithium type of batteries are by far the most popular rechargeable batteries used to power the electrical equipment 105 listed above. Each cell stack 111-11n includes battery cells that are series connected internally and, in some cases, also parallel connected. Each sense & control electronics unit 121-12n typically includes rather sophisticated module management electronic circuitry including a microcontroller.

As depicted, each sense & control electronics unit 121-12n is daisy-chained one to another, ending up with a connection to the central battery controller 140. It is noteworthy that other arrangements are available for those units to interface with the central battery controller 140. The central battery controller 140 usually provides operation and charge/discharge control and internal and external communication. As shown, batteries 131-13n are series connected to deliver a total required voltage to the electrical equipment 105 across the positive output terminal 110 and the negative output terminal 111. Series relays 101 and 102 are provided in the positive path and the negative path to said terminals, respectively. The central battery controller 140 controls the turn-on and turn-off of the relays 101 and 102, so that the battery power may be connected to or disconnected from the electrical equipment 105. The system 100 as illustrated includes key components to provide battery power to the electrical equipment 105 for operation.

Figure 2A:
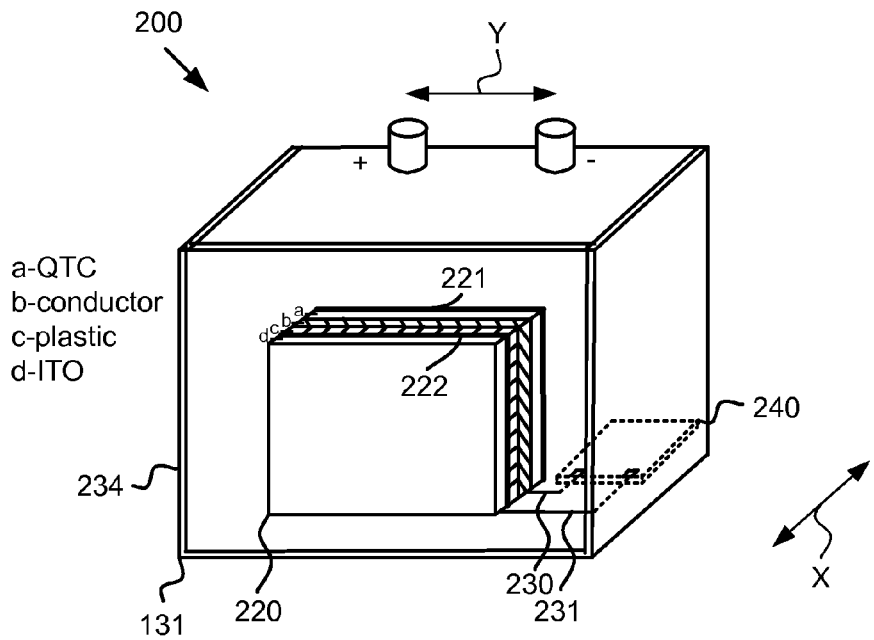
FIG. 2a is a front perspective view of an attachment of a pressure-capacitive sensor to a case of a battery of FIG. 1 in accordance with one embodiment of the present invention.

FIG. 2a is a front perspective view of an attachment 200 of a pressure-capacitive sensor 220 to a case of a battery 131 of FIG. 1 in accordance with one embodiment of the present invention. The description of the attachment 200 refers to elements of FIG. 1, like numbers referring to like elements. The battery shape is not limited to a rectangular or square type, such as shown. In fact, it is not uncommon for a battery to take on a cylindrical or prismatic shape, for example. Fault detection in batteries frequently make use of one or more sensors of a certain type such as force (pressure) sensitive sensors, piezoelectric sensors, temperature sensors, to name a few. To detect swelling in batteries, various pressure sensors have been suggested. Often pressure can be converted to some intermediate form such as displacement. The sensor then converts this displacement into electrical output such as voltage or current. A number of universal types of pressure transducers of this form are available for measurement. Conventional strain gages include those which rely on a change in electrical resistance of a resistor placed under strain. Other conventional methods to measure strain using surface acoustic wave technology or magneto strictive material are known. However, there are pros and cons of each type in terms of cost, structural and setup complexities, accuracy, size, and sensitivity to high temperature. A different, simple and effective type of sensor is introduced herein to facilitate measurement of changes in batteries, indicative of the occurrence of swelling beyond an acceptable threshold.

As depicted, the attachment 200 includes a pressure-capacitive sensor 220 in contact with a case 234 of the battery 131 and a capacitance measuring module 240. Although only one such contact sensor is shown attached in the direction X on one side, a plurality of like contact sensors may be attached to different sides of the battery 131 including those in the direction Y. In an alternate embodiment, the pressure-capacitive sensor 220 may be attachable to interior of the battery 131. The pressure-capacitive sensor includes a QTC sheet and a layer of electrically conductive material coated thereon. QTC, short for quantum tunneling composite, is a composite material of metal and non-conducting elastomeric binder, usable as pressure sensor. In its normal state QTC is an excellent insulator ($10^{12}$ ohms), wherein the conductive elements are too far apart to conduct electricity. When compressed, with just finger pressure, they move substantially closer and electricity can tunnel across the insulator, whereby QTC becomes a near perfect conductor (less than 1 ohm). Such conductance is able to pass very high current such as on the order of 10 amps through a 4 mm square that is 1.5 mm thick.

The QTC sheet herein includes a layer of QTC material (designated a), a layer of conductive material (b), and a layer of insulating material (c). The QTC layer is in contact with the case 234 of the battery 131 on a first face 221, the boundaries of which are shown in heavy lines. The QTC sheet's second face 222, also bounded by heavy lines, is coated with a layer of conductive material such as ITO (d), short for indium tin oxide, although it may be copper or another type of conductive material as well. ITO is one of the most widely used conductive oxides because of its electrical conductivity and optical transparency as well as the ease with which it can be deposited as a thin film. Note that all layers of material are grossly exaggerated in sizes as shown.

The capacitance measuring module 240 is used to measures the capacitance of a capacitor connected to it. The capacitance measuring module 240 may be located in the sense & control electronics unit 121 although it may be a separate component or circuit in the battery 131. The capacitor herein includes conductor b and conductor d having a dielectric material c sandwiched between said two conductors. In the depicted embodiment, conductor b and conductor d are connected to the capacitance measuring module 240 by conductors 230 and 231, respectively, which may be flat and flexible. While said QTC sheet is unpressed, the capacitance measuring module 240 measures the capacitance and saves it as a reference value to be subsequently used to determine a change in capacitance that may take place if the battery 131 swells.

The capacitance measuring module 240 typically includes a microcontroller, which may be an existing one in the battery 131 or may be a separate one. As one skilled in the art knows well, the measuring techniques of a microcontroller may make use of the characteristics of the capacitor itself and are universal and easily implementable with most microcontrollers. For example, with a series resistor of known value connected, the capacitance of the capacitor may be determined by noting the time it takes the capacitor to charge up to 63% of a source voltage. Alternatively, based on an oscillation circuit with known accurate resistance values, the capacitance as a primary component may be determined indirectly by measuring the frequency of the oscillation circuit output pulses. The attachment 200 includes QTC-based pressure-capacitive sensor 220 in contact with the case 234 of the battery 131 and the connected capacitance measuring module 240, which may be used to measure the capacitance of the capacitor formed by said sensor and the change in capacitance due to swelling of the battery 131.

Figures 2B, 2C:
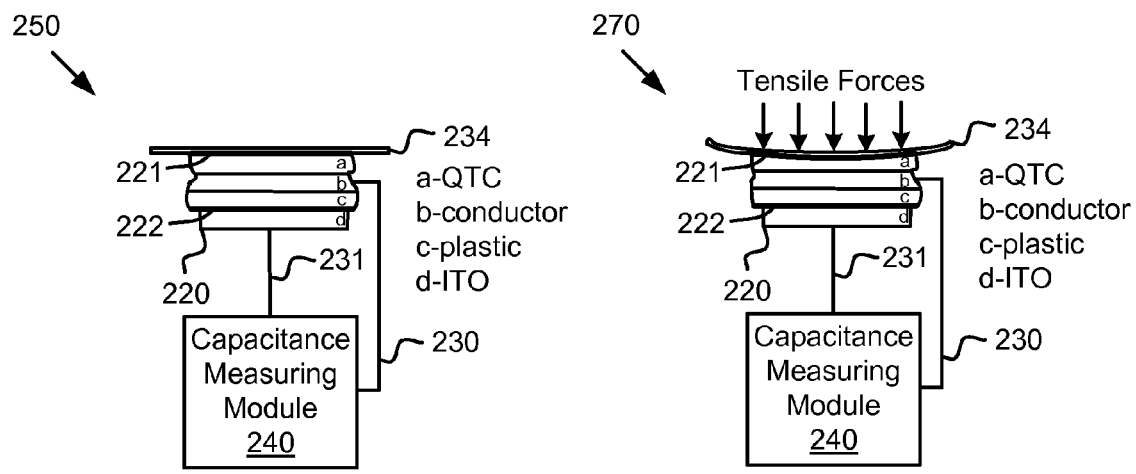
FIG. 2b is a schematic block diagram illustrating one embodiment of a cross section of the pressure-capacitive sensor of FIG. 2a under capacitance measurement before battery swelling in accordance with the present invention.
FIG. 2c is a schematic block diagram illustrating one embodiment of a cross section of the pressure-capacitive sensor of FIG. 2a under capacitance measurement after battery swelling in accordance with the present invention.

FIG. 2b is a schematic block diagram illustrating one embodiment of a cross section 250 of the pressure-capacitive sensor of FIG. 2a under capacitance measurement before battery swelling in accordance with one embodiment of the present invention. The description of the cross section 250 refers to elements of FIGS. 1 and 2a, like numbers referring to like elements. The cross section 250 is taken along a line (not shown) in parallel to the direction X. As illustrated, the battery case 234 in its normal size and shape does not exert any noticeable pressure on the contacted QTC (a), one of the four layers of material making up the pressure-capacitive sensor 220 as described in foregoing discussion. As a result, no significant change in capacitance measurement by the connected capacitance measuring module 240 takes place, which is the case throughout the normal battery life until battery swelling starts. The cross section 250 of the 4-layer pressure-capacitive sensor in unpressed contact with the case 234 of the battery 131 during the absence of battery swelling is illustrated.

FIG. 2c is a schematic block diagram illustrating one embodiment of a cross section 270 of the pressure-capacitive sensor of FIG. 2a under capacitance measurement after battery swelling in accordance with one embodiment of the present invention. The description of the cross section 270 refers to elements of FIGS. 1, 2a and 2b, like numbers referring to like elements. Before addressing the phenomenon of battery swelling, a brief discussion of some basic facts about the capacity and life of a battery is in order. As well known, during operation, the battery's capacity may diminish over time from use, aging, cycling, lack of maintenance, damage, heat, and/or manufacturing defects. For example, oxidation of electrolyte and/or degradation of cathode and anode material within a battery may be caused by repeated charging cycles and/or age, which cause a gradual reduction in the battery's capacity. As the battery continues to age and degrade, the capacity's rate of reduction may increase. At a certain point of time, the battery's useful life may be finished.

Subsequent use of a battery beyond the battery's end-of-life may cause swelling of the battery's cells and may potentially damage the electrical equipment powered by the battery while providing little power to the electrical equipment. Typical battery monitoring mechanisms may not include detection of swelling and prevention of potential safety hazards. Consequently, a user of the electrical equipment may not be aware of the battery's swelling occurrence and/or degradation until swelling leads to battery failure and/or damage to the electrical equipment. Battery swelling may be the final stage before explosion. One can liken a swollen battery to a ticking time bomb. Some reports address extreme cases wherein batteries after swelling caught fire with explosive force. Generally, these are Li-Ion batteries.

As illustrated, the cross section 270 of the pressure-capacitive sensor placed in contact with the case 234 of the battery 131 shows that QTC (a), the top layer, is compressed by the expanded battery case 234 as a result of swelling, which causes tensile forces to be applied to the QTC layer (a). Under pressure, the QTC becomes an electrical conductor, resulting in a distortion of the electrostatic field of the ITO layer (d), measurable as a change in capacitance. Now the pressure-capacitive sensor 220 is, in essence, a capacitive sensor. The capacitance measuring module 240 is connected to the sensor 220 to measure the increased capacitance. In general, a capacitor has a narrow separation, containing a dielectric (insulator), between two large areas of conductor. Hence capacitor conductors are often called "plates", referring to an early means of construction. When using a capacitive sensor, the sensor surface is the electrified plate, what is being measured (target) is the other plate. An initial swelling may not cause a significant change in said capacitance. However, as swelling becomes severe, the increase in capacitance under measurement may exceed a predetermined threshold.

If the measured capacitance minus the reference value established previously while no swelling takes place, the capacitance measuring module 240 will output a warning signal, indicative of an impending battery failure due to swelling. In disclosed embodiments, responsive of this signal the central battery controller 140 shown in FIG. 1 calls for replacement of the swelling battery and turns off the relays 101 and 102, interrupting battery power to the electrical equipment 105, thereby avoiding potential hazards such as fire and explosion.

Figure 3A:
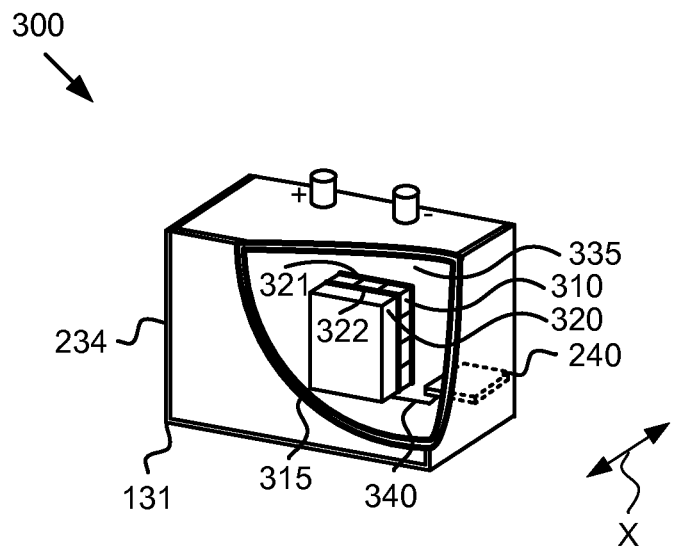
FIG. 3a is a front perspective view of an attachment of a capacitive sensor to an internal body of a battery of FIG. 1 in accordance with an alternate embodiment of the present invention.

FIG. 3a is a front perspective view of an attachment 300 of a capacitive sensor 315 to an internal body 335 of a battery 131 of FIG. 1 in accordance with an alternate embodiment of the present invention. The description of the attachment 300 refers to elements of FIGS. 1 and 2, like numbers referring to like elements. The concept of using a capacitive sensor to detect battery swelling has been introduced in the description of FIG. 2c. Herein the attachment 300 refers to placement of the capacitive sensor 315 in contact with the internal body 335 of the battery 131 on a first face 321, wherein the battery 131 is shown in a partial cutaway view. The capacitive sensor 315 includes a layer of electrically insulating material 310, such as plastic, and a coated layer of conductive material 320, typically ITO, on a second face 322 opposite to the first face 321. Coating with the layer of ITO 320, which is connected to the capacitance measuring module 240 through conductor 340, produces an electrostatic field. As one skilled in the art is familiar with the importance of proper grounding associated with this type of sensor, grounding is not discussed herein. Before the occurrence of swelling of the battery 131, the capacitance measured includes mostly parasitic capacitance in an electrical circuit. The attachment 300 includes placement of the capacitive sensor 315 in contact with the internal body 335 of the battery 131 in a normal state.

Figure 3B:
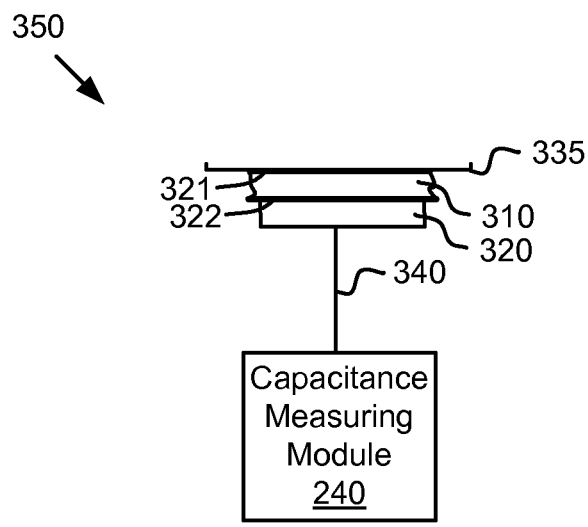
FIG. 3b is a schematic block diagram illustrating one embodiment of a cross section of the capacitive sensor of FIG. 3a under capacitance measurement after battery swelling in accordance with the present invention.

FIG. 3b is a schematic block diagram illustrating one embodiment of a cross section 350 of the capacitive sensor 315 of FIG. 3a under capacitance measurement after battery swelling in accordance with the present invention. The description of the cross section 350 refers to elements of FIGS. 1 and 2, like numbers referring to like elements. Herein the cross section 350 of the capacitive sensor 315 has a similar appearance to the cross section 250 of the pressure-capacitive sensor 220 shown in FIG. 2b, but with two less layers. When the battery 131 swells, the swollen internal body 335, which is also a conductor, touches the uncoated surface, referred to as first face 321, resulting in distortion of electrostatic field of the ITO layer 320. A capacitor is dynamically formed. The increase in capacitance is measurable by the capacitance measuring module 240. As measurement of increased capacitance and detection and consequence of an exceeding of a predetermined capacitance threshold due to battery swelling have been discussed, no repeated discussion is provided herein.

Figure 4:
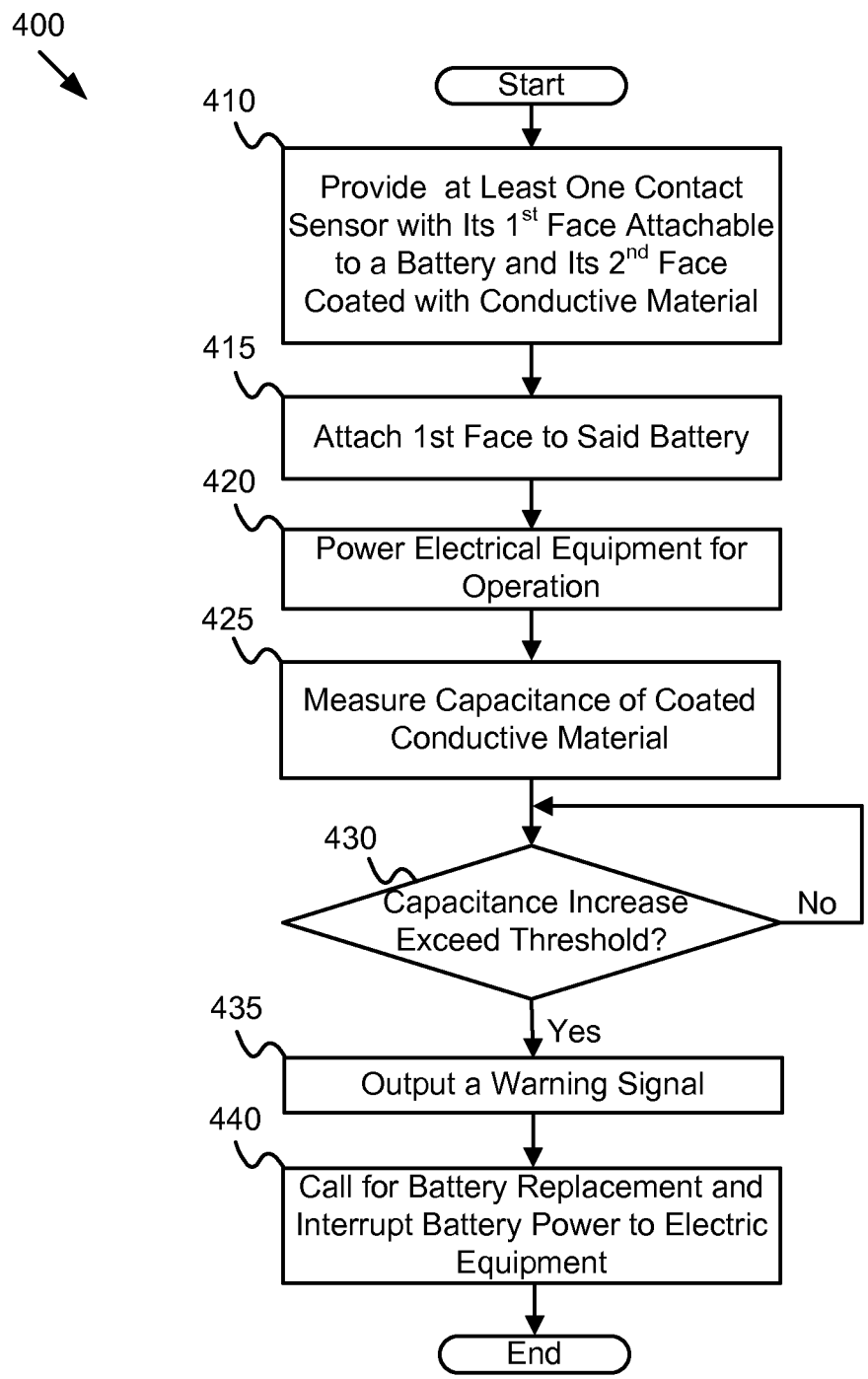
FIG. 4 is a schematic flow chart diagram illustrating one embodiment of a method for detecting swelling in batteries of FIG. 1 in accordance with the present invention.

FIG. 4 is a schematic flow chart diagram illustrating one embodiment of a method 400 for detecting swelling in batteries 131-13n of FIG. 1 in accordance with the present invention. The description of FIG. 4 refers to elements of FIGS. 1-3, like numbers referring to like elements. The method 400 begins by providing 410 at least one contact sensor, for example, a pressure-capacitive sensor 220 shown in FIG. 2a, with its first face 221 being attachable to a battery 131 and its second face 222 being coated with a conductive material, such as ITO. The method 400 proceeds to attach 415 the first face 221 to the battery 131. The method 420 powers the electrical equipment using the battery 131 for operation. The method 400 then measures 425 the capacitance of the coated conductive material ITO. The method 400 proceeds to determine 430 if the increase in capacitance under measurement exceeds a predetermined threshold.

If the increase in capacitance under measurement does not exceed the predetermined threshold, the method 400 continues to monitor the increase in capacitance under measurement. If the increase in capacitance under measurement exceeds the predetermined threshold, the capacitance measurement module 240 outputs 435 a warning signal. In response to the signal, the central battery controller 140 shown in FIG. 1 calls 440 for a replacement of the swelling battery 131 and interrupts battery power to the electrical equipment 105 by turning off relays 101 and 102. The method 400 accomplishes detection of swelling in batteries and prevents potential safety hazards triggerable by the swelling.

The use of a simple contact sensor such as a QTC-based pressure sensor coated with a conductive material such as ITO or a capacitive sensor coated with ITO in detection of swelling in batteries is efficient and cost effective. Measuring an increase in capacitance on the ITO-coated conductor to see if a predetermined threshold is exceeded indicative of swelling may be easily accomplished by a microcontroller that may already be available in each battery module. The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
at least one contact sensor comprising a structure of two or less layers of electrically insulating material, said structure configured to have a first face in contact with a battery and a second face opposite the first face, the second face being coated with a layer of electrically conductive material, said structure having two layers of electrically insulating material further configured to have a layer of electrically conductive material interposing therebetween, the material of a first electrically insulating layer in contact with a case of said battery on the first face being quantum tunneling composite ("QTC"), and a second layer of electrically insulating material comprising the second face; and
a capacitance measuring module connectable to said at least one contact sensor configured to determine an increase in capacitance of said layer of coated electrically conductive material from a reference value and output a warning signal if the increase of said capacitance exceeds a pre-determined threshold.

2. The apparatus of claim 1, wherein said layer of coated electrically conductive material is selected from the group consisting of indium tin oxide, copper and the like.

3. The apparatus of claim 1, wherein tensile forces applied to said QTC by the case of said battery resulting from swelling of said battery cause said QTC to become electrically conductive, leading to an increase in the capacitance of said layer of coated electrically conductive material.

4. The apparatus of claim 1, wherein said at least one contact sensor is a capacitive sensor, the structure thereof comprising one layer of electrical insulating material in contact with an internal body of said battery on the first face and coated with said layer of electrical conductive material on the second face.

5. The apparatus of claim 4, wherein the internal body of said battery becomes electrically conductive as a result of swelling of said battery, leading to an increase in the capacitance of said layer of coated electrically conductive material.

6. The apparatus of claim 1, wherein the capacitance measuring module comprises a microcontroller selected from the group consisting of an existing microcontroller and a separate microcontroller.

7. The apparatus of claim 6, wherein the capacitance measuring module further comprises a series resistor of a known value through which the capacitor under measurement is charged to a source voltage, whereby the microcontroller calculates the capacitance by measuring the time elapsed for said charging.

8. The apparatus of claim 6, wherein the capacitance measuring module further comprises an oscillation circuit, whereby the capacitance under measurement is determinable by the microcontroller by measuring the frequency of an output of the oscillation circuit.

9. A system comprising:
an electrical equipment;
at least one battery in a battery pack providing a positive output terminal and a negative output terminal coupled to the electrical equipment;
a relay in series with a coupling path to each said output terminal from said battery pack;
a central battery controller interfacing with said at least one battery configured to turn said relays on/off and provide internal and external communication;
at least one contact sensor comprising a structure of one two or less layers of electrically insulating material, said structure configured to have a first face in contact with said at least one battery and a second face opposite the first face, the second face being coated with a layer of electrically conductive material, said structure having two layers of electrically insulating material further configured to have a layer of electrically conductive material interposing therebetween, the material of a first electrically insulating layer in contact with a case of said battery on the first face being quantum tunneling composite ("QTC"), and a second layer of electrically insulating material comprising the second face; and
a capacitance measuring module connectable to said at least one contact sensor configured to determine an increase in capacitance of said layer of coated electrically conductive material from a reference value and output a warning signal if the increase of said capacitance exceeds a pre-determined threshold.

10. The system of claim 9, wherein said layer of coated electrically conductive material is selected from the group consisting of indium tin oxide, copper and the like.

11. The system of claim 9, wherein tensile forces applied to said QTC by the case of said at least one battery resulting from swelling thereof cause said QTC to become electrically conductive, leading to an increase in the capacitance of said layer of coated electrically conductive material.

12. The system of claim 9, wherein said at least one contact sensor is a capacitive sensor, the structure thereof comprising one layer of electrical insulating material in contact with an internal body of said at least one battery on the first face and coated with said layer of electrical conductive material on the second face.

13. The system of claim 12, wherein the internal body of said at least one battery becomes electrically conductive as a result of swelling of said at least one battery, leading to an increase in the capacitance of said layer of coated electrically conductive material.

14. The system of claim 9, wherein in response to the capacitance measuring module's warning signal, the central battery controller calls for a replacement of the swelling battery and turns off said relays, whereby battery power to the electrical equipment is interrupted.

15. A method for detecting swelling in each battery of a battery pack used in an electrical equipment comprising:
    providing at least one contact sensor comprising a structure of two or less layers of electrically insulating material, said structure configured to have a first face attachable to said battery and a second face opposite the first face, the second face being coated with a layer of electrically conductive material, said structure having two layers of electrically insulating material further configured to have a layer of electrically conductive material interposing therebetween, the material of a first electrically insulating layer in contact with a case of said battery on the first face being quantum tunneling composite ("QTC"), and a second layer of electrically insulating material comprising the second face;
    attaching the first face of said at least one contact sensor to said battery;
    powering the electrical equipment for operation;
    measuring capacitance of said layer of electrically conductive material coated on the second face of said at least one contact sensor;
    outputting a warning signal in response to detection that the measured capacitance minus a reference value exceeds a predetermined threshold; and
    calling for a replacement of said battery becoming swelling and interrupting battery power to the electrical equipment.

16. The method of claim 15, wherein said layer of coated electrically conductive material is selected from the group consisting of indium tin oxide, copper and the like.

17. The method of claim 15, wherein said at least one contact sensor is a capacitive sensor, the structure thereof comprising one layer of electrical insulating material attachable to an internal body of said battery on the first face and coated with said layer of electrical conductive material on the second face.

* * * * *